(12) United States Patent
Measom et al.

(10) Patent No.: US 10,859,259 B2
(45) Date of Patent: Dec. 8, 2020

(54) BURNER HOUSING FOR A PELLET GRILL

(71) Applicant: Logan Outdoor Products, LLC, Hyde Park, UT (US)

(72) Inventors: Ty Measom, Logan, UT (US); Brett Bennett, Mantua, UT (US); Trevor Mecham, Logan, UT (US); Roman Tinney, Providence, UT (US)

(73) Assignee: LOGAN OUTDOOR PRODUCTS, LLC, Hyde Park, UT (US)

( * ) Notice: Subject to any disclaimer, the term of this patent is extended or adjusted under 35 U.S.C. 154(b) by 132 days.

(21) Appl. No.: 16/162,540

(22) Filed: Oct. 17, 2018

(65) Prior Publication Data

US 2020/0124274 A1    Apr. 23, 2020

(51) Int. Cl.
| | | |
|---|---|---|
| *F24B 1/00* | (2006.01) | |
| *F23B 80/02* | (2006.01) | |
| *A47J 37/07* | (2006.01) | |
| *F23B 40/08* | (2006.01) | |

(52) U.S. Cl.
CPC .......... *F23B 80/02* (2013.01); *A47J 37/0704* (2013.01); *F23B 40/08* (2013.01)

(58) Field of Classification Search
CPC .............................. F23B 80/02; A47J 37/0786
USPC ........................................................ 126/146
See application file for complete search history.

(56) References Cited

U.S. PATENT DOCUMENTS

| | | | | |
|---|---|---|---|---|
| 2,587,140 | A * | 2/1952 | Gorshkoff | F23D 11/406 239/472 |
| 3,311,456 | A * | 3/1967 | Denny | F23G 7/066 422/173 |
| 3,361,365 | A * | 1/1968 | Dysart | F23D 11/408 239/402.5 |
| 4,528,917 | A | 7/1985 | Jacobs | |
| 4,782,765 | A | 11/1988 | Miller et al. | |
| 5,070,798 | A | 12/1991 | Jurgens | |
| 5,137,010 | A | 8/1992 | Whitfield et al. | |
| 5,873,356 | A | 2/1999 | Vossler et al. | |
| 5,941,234 | A | 8/1999 | Norburn et al. | |
| 7,530,351 | B2 | 5/2009 | Leverty et al. | |
| 8,322,331 | B2 | 12/2012 | Swanson | |
| 2001/0055737 | A1 * | 12/2001 | Sestrap | F23D 14/64 431/353 |
| 2009/0205545 | A1 | 8/2009 | Brage et al. | |

(Continued)

FOREIGN PATENT DOCUMENTS

| | | |
|---|---|---|
| CN | 107687635 | 2/2018 |
| EP | 2019262 | 1/2010 |
| WO | WO1988031968 | 7/1998 |

(Continued)

*Primary Examiner* — Avinash A Savani
(74) *Attorney, Agent, or Firm* — Amardeep S. Grewal; Gerard M. Donovan; Reed Smith LLP

(57) ABSTRACT

The invention relates to a burner housing for a pellet grill having two or more elongated apertures configured to have a first end with an adjacent first width and a second end with an adjacent second width, the adjacent second width relatively greater than the adjacent second width. The burner housing generates an air vortex when in burner operation in such a manner as to provide relatively more air movement in an area somewhat distal to the burner, thereby retaining an optimal amount of ash during lengthy cooking cycles while also providing optimal fuel-to-air characteristics.

24 Claims, 4 Drawing Sheets

(56) References Cited

U.S. PATENT DOCUMENTS

2011/0297110 A1    12/2011  Malatesta et al.
2014/0318524 A1*   10/2014  Measom ............... F24B 13/006
                                                        126/25 R

FOREIGN PATENT DOCUMENTS

WO    WO2000075563    12/2000
WO    WO2003019077     3/2003

* cited by examiner

BURNER HOUSING FOR A PELLET GRILL

BACKGROUND OF THE INVENTION

Pellet grills are cookers that combine elements of charcoal smokers, gas grills, and kitchen ovens. They are fueled by wood pellets and infuse food with smoky flavor associated with charcoal grills and smokers, with the convenience of gas grills, and the temperature control of traditional indoor ovens. Pellet grills can smoke as well as grill and bake using an electronic control panel to automatically feed fuel to the fire, regulate the grill's airflow, and maintain consistent cooking temperatures. Despite increasing market differentiation in pellet grills, certain features and functionality remain elusive or suboptimal. For example, pellet grills can introduce excessive amounts of ash and/or particulate matter into food cooking areas, which can adversely affect food flavor. Innovations like pellet fueled grills with cleanout ports (see, e.g., U.S. Pat. No. 9,635,978) offer partial solution. However, some cooking applications remain problematic, particularly those requiring lengthy burn times. Such applications may result in overaccumulation of ash in cleanout ports and adversely affect fuel-to-air mixture. What is needed for such applications is a way to moderate and control ash collection while maintaining optimal fuel-to-air ratios.

SUMMARY OF THE INVENTION

In accordance with the above, a burner housing for a pellet grill is provided. The burner housing includes: a first end with a first opening; a second end; and a substantially continuous side portion having two or more elongated apertures disposed thereon, wherein each of the two or more elongated apertures is configured to have a first end with an adjacent first width and a second end with an adjacent second width, the adjacent second width relatively greater than the adjacent second width. So configured, the burner housing generates an air vortex when in burner operation in such a manner as to provide relatively more air movement in an area adjacent to the first end, thereby retaining an optimal amount of ash during lengthy cooking cycles while also providing optimal fuel-to-air characteristics. The problem of providing moderated and controlled ash collection in a pellet grill while also maintaining optimal fuel-to-air ratios is solved.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through use of the accompanying drawings in which.

DETAILED DESCRIPTION OF THE ILLUSTRATED EMBODIMENT

Figure 1:
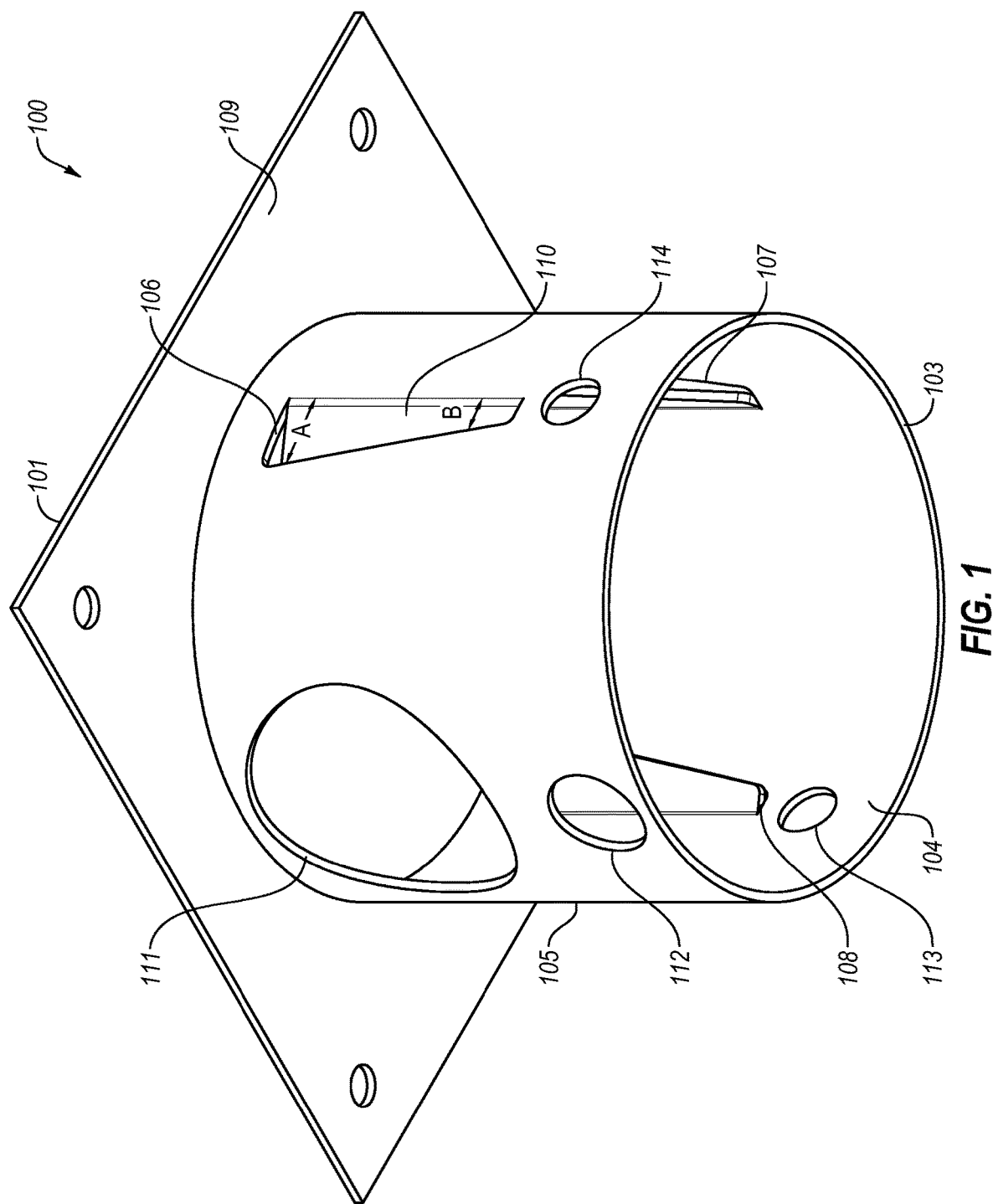
FIG. 1 is a perspective view of one embodiment of a burner housing for a pellet grill.

The present invention in its various embodiments, some of which are depicted in the figures herein, is a burner housing for a pellet grill. Referring now to FIG. 1, one embodiment of a burner housing for a pellet grill 100 is shown. Burner housing 100 has a first end 101 with a first opening 102, a second end 103, and a substantially continuous side portion 105 having two or more elongated apertures disposed thereon. The illustrated embodiment has three such elongated apertures 106, 107, and 108, although other embodiments may have more or less. Second end 103 may have a second end opening 104 or be closed, depending on the embodiment. Burner housing 100 may be generally cylindrical, or some other shape, or combination of shapes, depending on the embodiment. Burner housing 100 may have one or more mounting plates 109 for attachment to a pellet grill.

Figure 2:
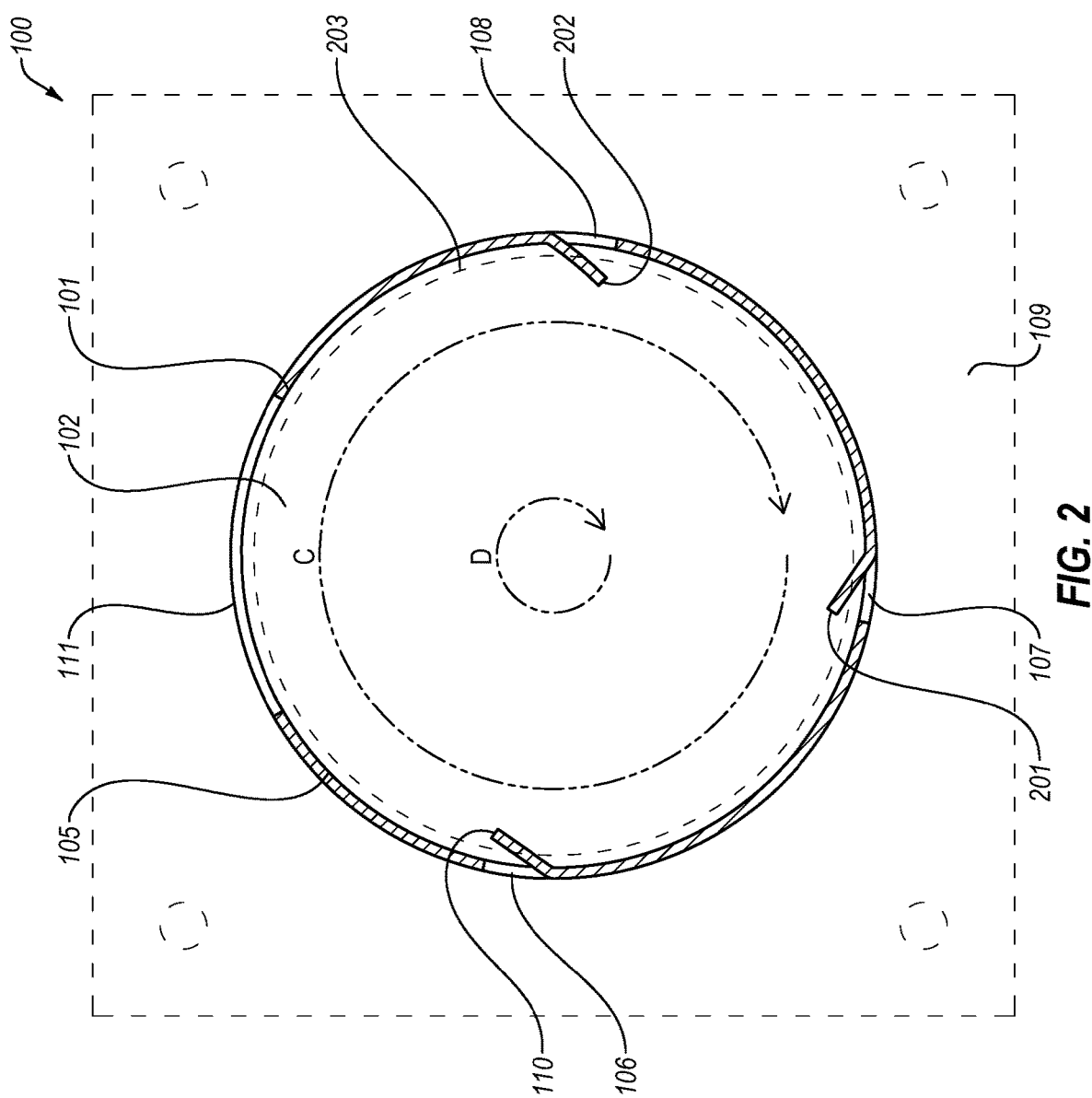
FIG. 2 is a top, partial cross-section view of one embodiment of a burner housing for a pellet grill.

Elongated apertures are configured to have a first end with an adjacent first width A and a second end with an adjacent second width B, the first width A relatively greater than the second width B. Elongated apertures may be generally parallel to a longitudinal axis of the burner housing 100. Elongated apertures may be configured triangularly and/or as a right triangle, as shown in the illustrated embodiment. Referring briefly to FIG. 2, directional fins 110, 201, and/or 202 may be disposed on the substantially continuous side portion 105 adjacent to corresponding elongated apertures and be configured to angle towards an inner portion of the burner housing 100.

Referring back to FIG. 1, in addition to elongated apertures set forth above, substantially continuous side portion 105 may also have one or more non-elongated apertures disposed thereon. For example, a fuel aperture 111 may be configured for delivering wood pellets to the inner portion of the burner housing 100. In another example, a burner aperture 112 may be configured to allow a hot rod or other burner to enter the inner portion of the burner housing. As another example, one or more non-elongated apertures 113, 114 may be configured to provide supplemental air supply within the burner housing 100 when in burner operation, as discussed in more detail below.

Figure 3:
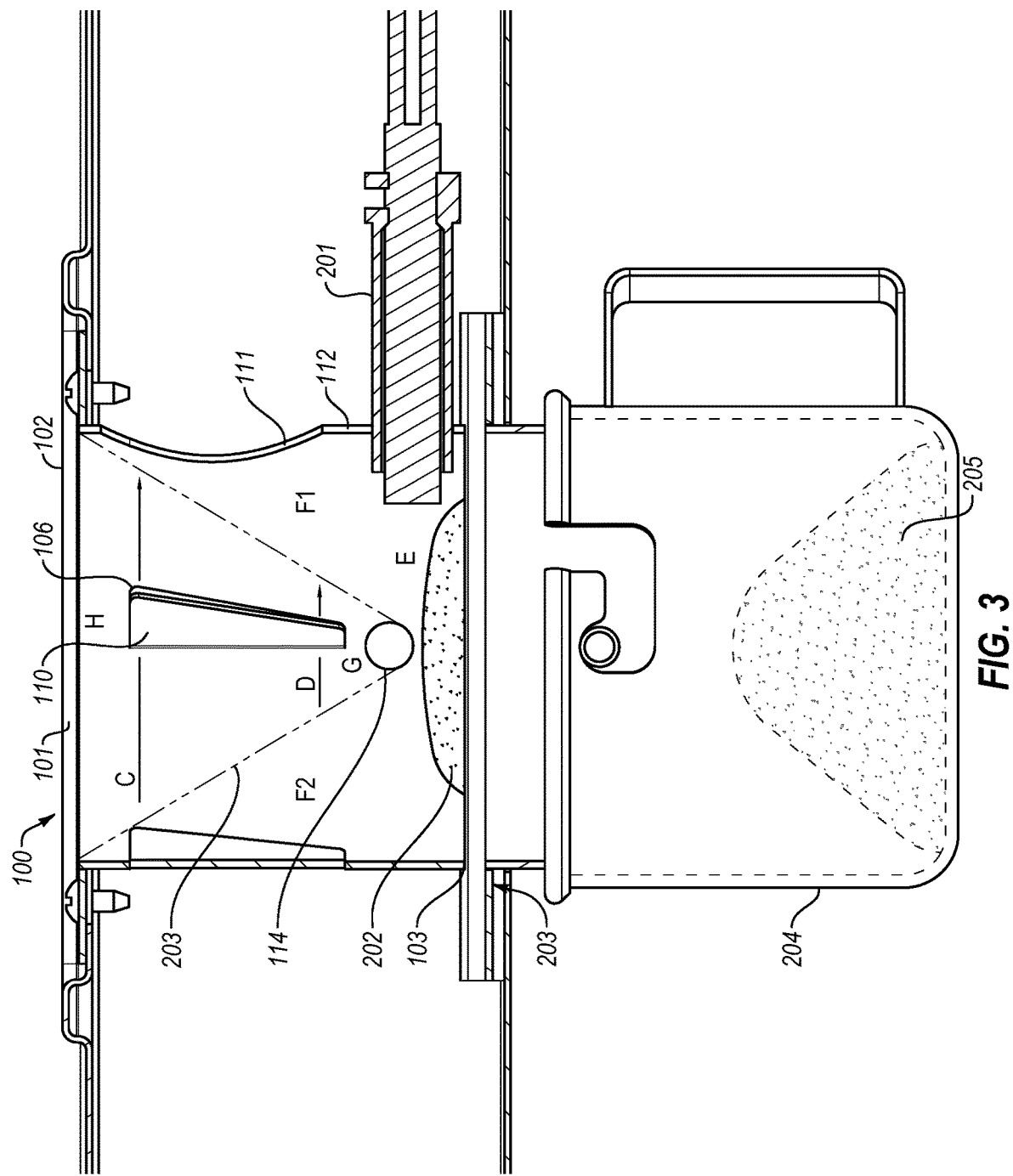
FIG. 3 is a side, partial cross-section view of one embodiment of a burner housing for a pellet grill.

Referring now to FIGS. 2 and 3, configured as set forth above, burner housing 100 in its various embodiments is designed to generate an air vortex 203 when in burner operation. More specifically, when in burner operation, elongated apertures and directional fins—combined with combustion in the lower portion E of the housing 100—direct air movement (in directions C & D) circularly between area H, adjacent the first end 101, and area G, adjacent the second end 103. In various embodiments, elongated apertures and directional fins create more air movement adjacent to area H, adjacent to first end 101, than to area G, adjacent to second end 103. Areas F1 and F2, adjacent to the air vortex 203, generally generate less air movement than either areas G or H when in burner operation.

As set forth above, one or more non-elongated apertures (e.g., 114) may be configured to provide supplemental air supply within the burner housing 100 when in burner operation. The resulting air vortex dynamics of the disclosed structure include wider and greater air movement adjacent to the first end, narrower and less air movement adjacent to the second end, and bordering pockets of even less air movement. Such dynamics retain an optimal amount of ash and particulate matter adjacent to the second end 103 during lengthy cooking cycles (for example, over 4 to 6 hours) while also providing optimal fuel-to-air characteristics at and/or around the lower portion E of the housing 100 during burner operation.

In various embodiments, burner housing 100 may be used in connection with an ash cleanout 203, whereby ash and/or combusted particulate matter 202 is collected for later disposal between burner and/or cooking operations. The ash cleanout 203 used may be of one or more designs set forth in U.S. Pat. No. 9,635,978, or any other design suitable for collection of ash and/or combusted particulate matter, or transport of the same from the lower portion E to a separate collection area 204. Importantly, burner housing 100 may also be used without an ash cleanout 202, and have one or more closed second ends 103, or other compatible configurations.

Figure 4:
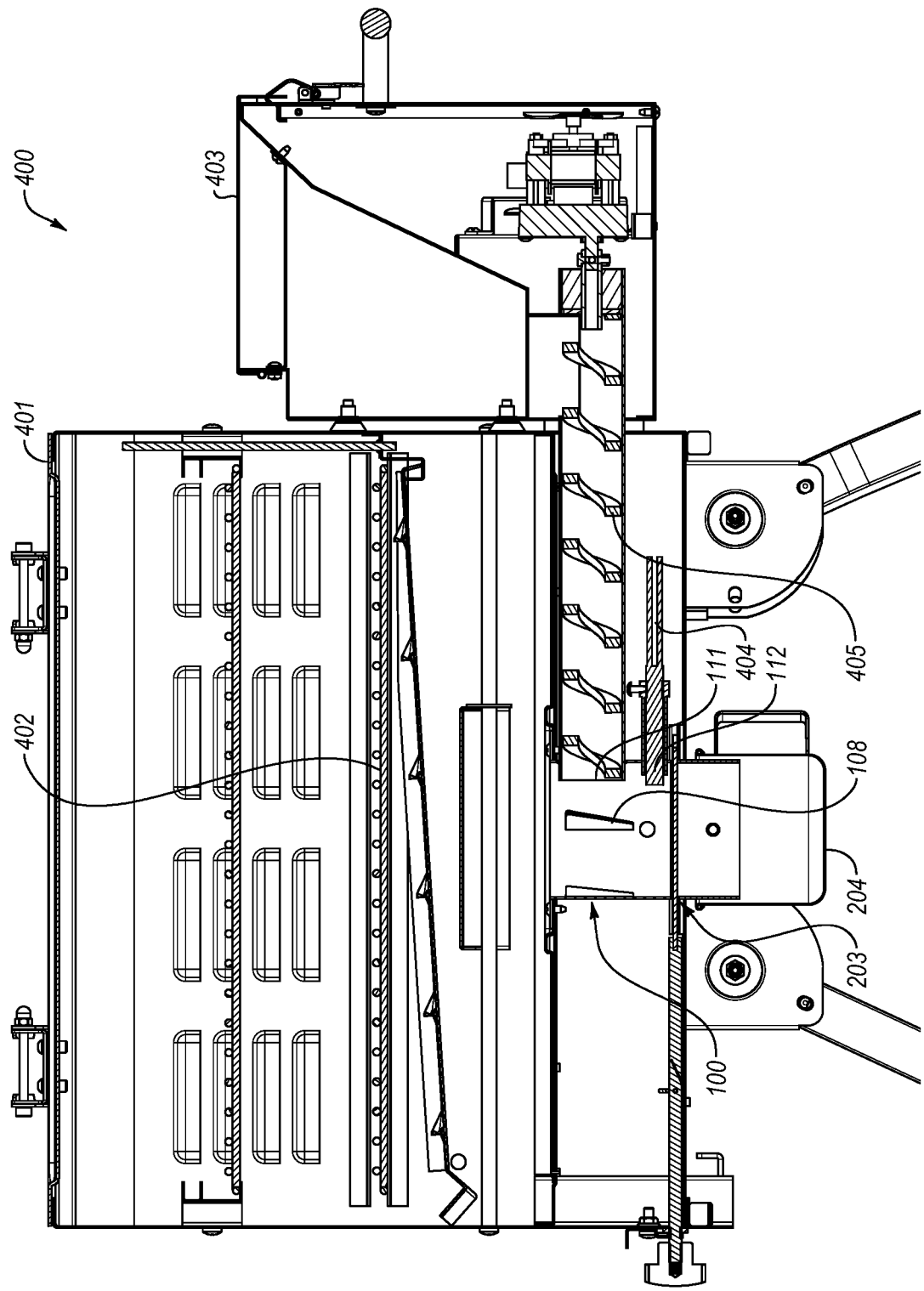
FIG. 4 is a front view of one embodiment of a burner housing for a pellet grill, shown in a pellet grill environment.

Referring now to FIG. 4, the burner housing 100 is shown in a pellet grill environment 400. When in operation, the burner housing 100 is located within the pellet grill body 401, below a cooking area 402, and to a side of a wood pellet hopper 403. A hot rod or other burner element 404 and pellet auger 405 is shown in communication with the burner housing 100, at apertures 112 and 111 respectively.

Thus configured, embodiments of the present invention provide a burner housing for a pellet grill comprising a first end with a first opening; a second end; and a substantially continuous side portion having two or more elongated apertures disposed thereon, wherein each of the two or more elongated apertures is configured to have a first end with an adjacent first width and a second end with an adjacent second width, the adjacent second width relatively greater than the adjacent second width. So configured, the burner housing generates an air vortex when in burner operation in such a manner as to provide relatively more air movement in an area adjacent to the first end, thereby retaining an optimal amount of ash during lengthy cooking cycles while also providing optimal fuel-to-air characteristics. The problem of providing moderated and controlled ash collection in a pellet grill while also maintaining optimal fuel-to-air ratios is solved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A burner housing for a pellet grill comprising:
a first end comprising a first end opening;
a second end located opposite the first end; and
a surface extending from the first end to the second end and having two or more apertures disposed thereon, each of the two or more apertures having a first width proximate to the first end that is greater than a second width proximate to the second end;
wherein the two or more apertures are configured to generate air movement within an interior region defined by the surface, the air movement within the interior region being greater proximate to the first end than proximate to the second end.

2. The burner housing for a pellet grill of claim 1, the second end further comprising a second end opening.

3. The burner housing for a pellet grill of claim 1, wherein the two or more apertures are configured to generate an air vortex within the interior region.

4. The burner housing for a pellet grill of claim 1, wherein the surface comprises a cylindrical surface.

5. The burner housing for a pellet grill of claim 1, wherein each of the two or more apertures is parallel to a longitudinal axis of the burner housing.

6. The burner housing for a pellet grill of claim 1, further comprising two or more directional fins disposed on the surface.

7. The burner housing for a pellet grill of claim 6, wherein each directional fin in the two or more directional fins is adjacent to a corresponding aperture in the two or more apertures.

8. The burner housing for a pellet grill of claim 6, wherein each directional fin in the two or more directional fins is configured to direct air through a corresponding aperture in the two or more apertures and into the interior region.

9. The burner housing for a pellet grill of claim 1, wherein at least one of the two or more apertures comprises a triangular aperture.

10. The burner housing for a pellet grill of claim 1, wherein at least one of the two or more apertures tapers from the first width proximate to the first end to the second width proximate to the second end.

11. The burner housing for a pellet grill of claim 1, further comprising one or more additional apertures disposed on the surface.

12. A burner housing for a pellet grill comprising:
a first end;
a second end; and
a surface extending from the first end to the second end and having two or more apertures disposed thereon, each of the two or more apertures having a first width proximate to the first end that is greater than a second width proximate to the second end;
wherein the surface and the two or more apertures are configured to direct air exterior to the surface into an interior region defined by the surface and thereby generate air movement within the interior region, the air movement within the interior region being greater proximate to the first end than proximate to the second end.

13. The burner housing for a pellet grill of claim 12, the first end comprising a first end opening.

14. The burner housing for a pellet grill of claim 12, the second end comprising a second end opening.

15. The burner housing for a pellet grill of claim 12, wherein the two or more apertures are configured to generate an air vortex within the interior region.

16. The burner housing for a pellet grill of claim 12, wherein the surface comprises a cylindrical surface.

17. The burner housing for a pellet grill of claim 12, wherein each of the two or more apertures is parallel to a longitudinal axis of the burner housing.

18. The burner housing for a pellet grill of claim 12, further comprising two or more directional fins disposed on the surface.

19. The burner housing for a pellet grill of claim 18, wherein each directional fin in the two or more directional fins is adjacent to a corresponding aperture in the two or more apertures.

20. The burner housing for a pellet grill of claim 18, wherein each directional fin in the two or more directional fins is configured to direct air through a corresponding aperture in the two or more apertures and into the interior region.

21. The burner housing for a pellet grill of claim 12, wherein at least one of the two or more apertures comprises a triangular aperture.

22. The burner housing for a pellet grill of claim 21, wherein at least one of the two or more apertures tapers from the first width proximate to the first end to the second width proximate to the second end.

23. The burner housing for a pellet grill of claim 12, further comprising one or more additional apertures disposed on the surface.

24. A burner housing for a pellet grill comprising:
- a first end comprising a first end opening and a second end comprising a second end opening;
- a cylindrical surface extending from the first end to the second end and having a plurality of apertures disposed thereon, each aperture being parallel to a longitudinal axis of the burner housing and having a first width proximate to the first end that is greater than a second width proximate to the second end; and
- a plurality of directional fins corresponding to the plurality of apertures, each directional fin being adjacent to a corresponding aperture and being configured to direct air through the corresponding aperture and into an interior region of the cylindrical surface;
- the plurality of elongated apertures and the plurality of directional fins being configured to generate a vortex within the interior region, the vortex narrowing in width from the first end to the second end to thereby retain a portion of particulate matter generated during operation of the pellet grill within an area proximate to the second end.

* * * * *